United States Patent [19]

Follmann et al.

[11] Patent Number: 4,689,153
[45] Date of Patent: Aug. 25, 1987

[54] PROCESS OF AND APPARATUS FOR ULTRAFILTRATION

[75] Inventors: Heinrich Follmann, Koenigswinter, Fed. Rep. of Germany; Heinrich Ebner, Linz, Austria

[73] Assignee: Heinrich Frings GmbH & Co. KG, Bonn, Fed. Rep. of Germany

[21] Appl. No.: 763,051

[22] Filed: Aug. 6, 1985

[30] Foreign Application Priority Data

Aug. 30, 1984 [AT] Austria .................. 2780/84

[51] Int. Cl.⁴ ............................ B01D 13/00
[52] U.S. Cl. .............. 210/650; 210/195.2; 210/257.2; 210/433.2
[58] Field of Search ............. 210/744, 97, 104, 105, 210/195.2, 257.2, 433.2, 650

[56] References Cited

U.S. PATENT DOCUMENTS

| | | | |
|---|---|---|---|
| 1,825,631 | 9/1931 | Horvath | 210/257.2 X |
| 3,472,765 | 10/1969 | Budd et al. | 210/7 |
| 3,998,740 | 12/1976 | Bust et al. | 210/195.2 |
| 4,227,999 | 10/1980 | Ebner | 210/650 |

FOREIGN PATENT DOCUMENTS 2746460  4/1979  Fed. Rep. of Germany .

OTHER PUBLICATIONS

"Crossflow-Mikrofiltration: Ein Membranverfahren zur Aufkonzentrierung von Suspensionen" by Dr. W. Klein, Verfahrenstechnik 15 (1981), No. 7, pp. 490–492.

Primary Examiner—Frank Spear
Attorney, Agent, or Firm—Norbert P. Holler

[57] ABSTRACT

In an ultrafiltration of a liquid having a starting solids concentration, in which the liquid is pumped through a filtration circuit including at least one membrane filter, and the loss of liquid resulting from the continuous extraction of filtrate from the filtration circuit is compensated for by feeding unfiltered liquid into the filtration circuit from a separate concentrate container which is connected with the filtration circuit by a feedline and a return line for flow of liquid to and from the filtration circuit, the liquid in the filtration circuit is periodically and repeatedly supplemented by additions of fresh unfiltered liquid taken from a reservoir having the starting solids concentration so as to repeatedly bring the solids concentration in the filtration circuit closer to the starting concentration. The individual fresh liquid additions from the reservoir are initiated in response to the level of the liquid in the concentrate container falling from a predetermined higher level to a predetermined lower level and are interrupted when the liquid in the container again reaches the given higher level. Filtration cycles lasting for a few weeks between each two successive shutdowns of the system for cleaning are achieved. The foregoing abstract is not to be deemed a complete exposition of the present invention, however, the details of which can be discerned only by reference to and from the hereto appended specification and claims.

15 Claims, 1 Drawing Figure

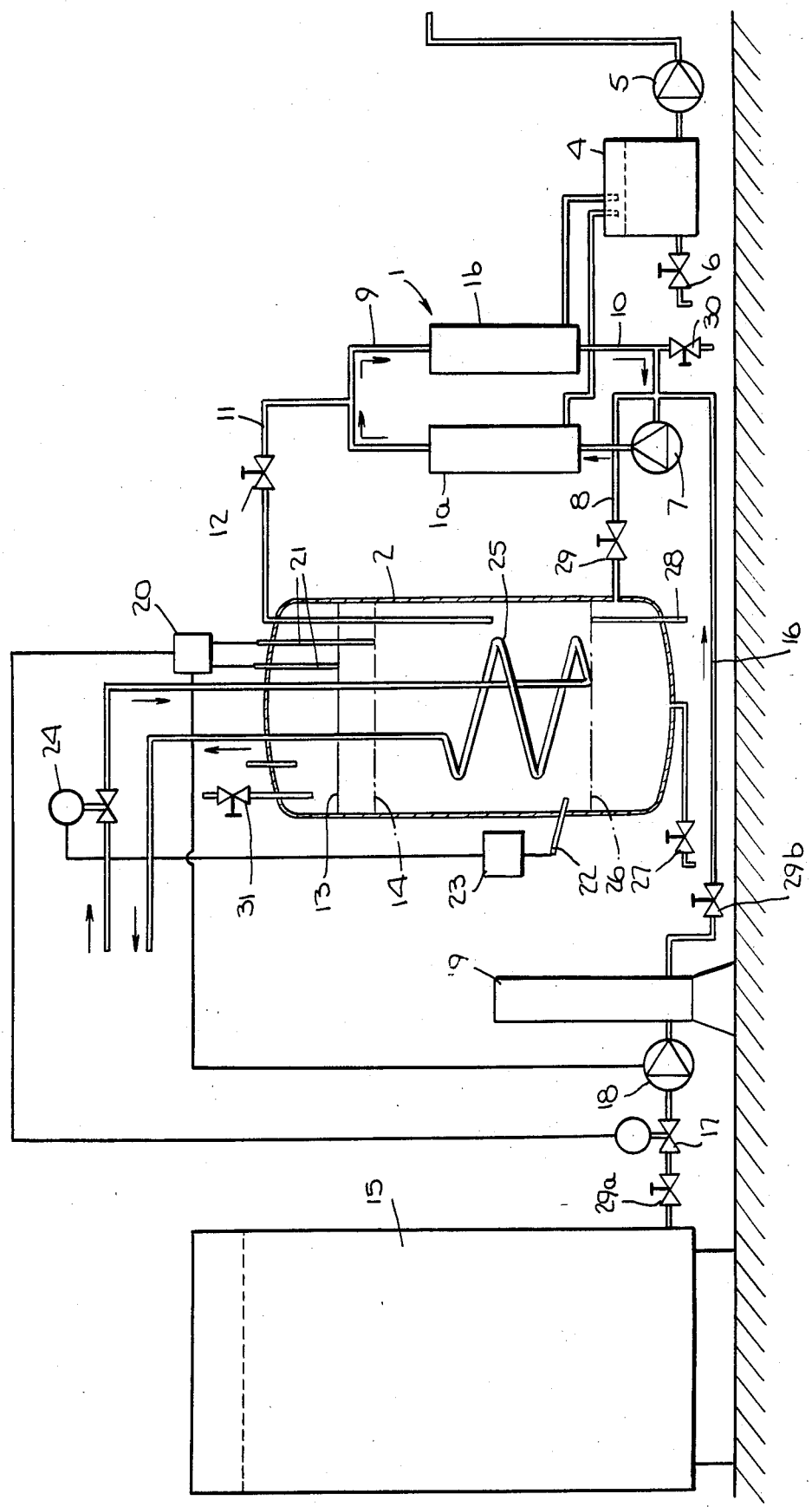

PROCESS OF AND APPARATUS FOR ULTRAFILTRATION

This invention relates to a process of and apparatus for ultrafiltration wherein the lengths of the cycles between each two successive shutdowns for cleaning are on the order of a few weeks. In the course of each such cycle, the liquid to be filtered is pumped in at least one filtration circuit through at least one membrane or diaphragm filter and the diminution of liquid in the filtration circuit, which results from the continuous outflow of filtrate that in turn causes a continuous increase of the solids concentration, is compensated for by feeding into the filtration circuit a quantity of liquid from a concentrate tank which is disposed apart from the filtration circuit and is connected to the filtration circuit by respective feed and return or reflux lines.

The term "ultrafiltration" denotes a filtration process in which the liquid being filtered is passed through filter diaphragms or membranes with comparatively small pores, so that the quantity of filtrate passing through the membrane pores is at all times relatively small compared to the quantity of liquid flowing over the membranes. In order to perform such a filtration process, it is known from Austrian Pat. No. 277 895 (and its U.S. equivalent, U.S. Pat. No. 3,472,765) to pump the liquid being filtered over at least one membrane filter in a filtration circuit, in which the loss of liquid caused by the removal of filtrate is compensated for out of a concentrate tank which is separate from the filtration circuit and is connected to the latter by a feed line. In this process, a part of the quantity of liquid passing over the membrane filter is also refluxed into the concentrate tank from the filtration circuit, so that the solids concentration in the filtration circuit tends to be generally equal to the solids concentration in the concentrate tank while both the solids concentration in the filtration circuit and the solids concentration in the concentrate tank rise generally uniformly. As the solids concentration in the filtration circuit rises, however, the filtration efficiency or output drops, so that especially in the case of liquids which are difficult to filter there exists the danger that the filtration efficiency will start to drop very rapidly after a certain period of time because of the filter membranes having become covered and clogged with solids. Merely by way of example, in a filtration of alcohol vinegar or wine vinegar produced in shavings generators it is possible, by virtue of the presence of large molecule substances in such vinegars, to notice a rapid decrease of the filtration efficiency with increasing duration of the filtration operation.

The objective of the invention is, therefore, to improve a process and associated apparatus of the described type by simple means and in such a manner that a rapid decrease of the filtration efficiency can be inhibited even in the case of liquids which are difficult to filter, i.e. liquids which were heretofore deemed appropriate only to a limited degree for filtering by means of an ultrafiltration with appropriately extended cycle lengths.

The aforesaid objective of the present invention is achieved by means of a modificaton of the known process so that repeatedly at the end of each of a series of predetermined time intervals there is added to the filtration circuit a quantity of the unfiltered liquid in which the solids concentration is still at its original or starting value, the liquid being taken from a reservoir therefor.

During the injection-like addition of liquid having the starting solids concentration from the reservoir into the filtration circuit, the solids concentration in the filtration circuit is repeatedly brought closer to the starting solids concentration as a portion of the solids-laden liquid is refluxed from the filtration circuit into the concentrate tank through a branch line. Subsequently, a gradual increase of the solids concentration in the filtration circuit takes place, while at the same time the continuous material exchange with the concentrate tank ensures that the solids concentration in the filtration circuit cannot substantially exceed the solids concentration in the concentrate tank. This material exchange can be controlled by means of a throttle incorporated in the return or reflux line leading to the concentrate tank.

The repeated reversal of the solids concentration in the filtration circuit toward the starting solids concentration value has the effect of inhibiting a premature clogging of the filter membranes by solids. Thus, a substantial enhancement of the lengths of the cycles over which an ultrafiltration can be run between shutdowns, even in the case of liquids which are difficult to filter, is assured which exceeds by far the expected increase of the filtration efficiency resulting from the dilution of the solids concentration existing at any given stage in the filtration circuit by the addition of the quantity of unfiltered liquid having the starting solids concentration. As a consequence, even over longer periods of time it is no longer necessary to be concerned about the possibility of a major decrease in the filtration efficiency.

In view of the fact that the filtration efficiency changes with the solids concentration in the filtration circuit, it is advantageous to add the fresh unfiltered liquid with the starting solids concentration into the filtration circuit each time after a predetermined quantity of filtrate has flowed out of the circuit. The increase in the solids concentration depends, of course, on the extracted quantity of filtrate, so that by the implementation of the present invention the process can always be run in a fashion which will cause the fresh liquid feed to be effected in response to the occurrence of a prescribed increase in the solids concentration.

Especially simple operating conditions result when the extracted quantity of filtrate which triggers the fresh liquid feed is represented by the decrease in the contents of the concentrate tank, in which case the fresh liquid characterized by the starting solids concentration need be added to the filtration circuit only for as long as it takes for the original level of the tank contents to be reestablished.

By virtue of the dependence of the filtration efficiency on the solids concentration, the time intervals which are required for the recovery of a predetermined quantity of filtrate become longer as the duration of the filtration operation continues. In order to achieve an especially economical process it is advantageous, therefore, to repeat the step-wise addition of fresh unfiltered liquid characterized by the starting solids concentration to the filtration circuit only until a preset end concentration of the solids is attained in the concentrate tank. By appropriately selecting the said end solids concentration, therefore, the length of the filtration period between each two successive shutdowns of the system for the purpose of cleaning prior to a restarting of the filtration process can be optimized to provide the most economical combination of operating conditions and filtrate yield.

The temperature of the liquid being filtered increases with the duration of the filtration operation. Thus, in a refinement of the present invention the fresh liquid having the starting solids concentration is fed into the filtration circuit at a temperature that is lower than the temperature of the liquid already in the filtration circuit, whereby the filtration circuit can be repeatedly cooled in an extremely simple manner. The temperature change occurring simultaneously with the change in the solids concentration can then additionally support the effect of the concentration variations in the filtration circuit. In this connection, the viscosity change occurring with a temperature change plays a corresponding role.

In order to inhibit the temperature of the liquid in the concentration tank from exceeding an upper temperature limit for the concentrate, it is further contemplated by the present invention that the liquid in the concentrate tank can be cooled when the said limiting temperature is exceeded and that this would be done in particular independently of the addition of the cooler fresh liquid to the filtration circuit. A cooling of the liquid in the concentrate tank will, of course, have an effect, by virtue of the connections between the tank and the filtration circuit, on the temperature of the liquid in the filtration circuit as well.

For the practice of the process of the present invention, a system can be used which, to start with, consists of at least one filtration circuit equipped with at least one membrane filter, a circulating pump, and a concentrate tank separate from the filtration circuit, with the tank being connected to the filtration circuit via a feed line and a return or reflux line. When in such a system the filtration circuit is connected to an injection line which communicates directly with a reservoir for the fresh liquid to be filtered bypasses the concentrate tank altogether, in connection with which a control device is provided for controlling the injection of the liquid from the reservoir into the filtration circuit, then the said fresh liquid in which the starting solids concentration exists can be repeatedly fed directly into the filtration circuit in a simple manner in order to inhibit a premature formation of films or layers of solid particles on the filter membranes.

The control of the feed of liquid from the reservoir into the filtration circuit can be effected by means of an injection pump connected into the injection line, in conjunction with which the concentrate tank is provided with a sensing device for determining the existence two different liquid levels in the concentrate tank, so that the injection pump can be activated and deactivated by the sensing device depending on which level is sensed by the latter. This liquid level-regulated control at the same time fixes the time intervals between successive additions of fresh liquid from the reservoir to the filtration circuit, because the injection pump is not switched on until, as a result of the continuous extraction of filtrate, the lower of the two liquid levels is reached in the concentrate tank. The sensing device for this purpose can include either a float or a liquid level telemetering device having two liqid level-sensing probes positioned at the prescribed liquid levels.

The temperature of the concentrate rises, of course, with increasing duration of the filtration operation. The present invention thus contemplates that an upper limit should be provided for the temperature of the liquid in the concentrate tank. Accordingly, if the tank is further provided with a cooling device which is controlled with the aid of a temperature sensor in dependence on the liquid in the tank reaching the said upper limit temperature, then the desired temperature conditions in the concentrate tank can be suitably maintained.

The foregoing and other objectives, characteristics and advantages of the present invention will be more clearly understood from the following detailed description thereof when read in conjunction with the accompanying drawing, the sole FIGURE of which illustrates schematically a system which can be used for an ultrafiltration process of the present invention.

Referring now to the drawing in greater detail, the illustrated apparatus for performing ultrafiltrations includes a filtration circuit 1 which includes two membrane filters 1a and 1b and is connected to a concentrate tank 2 which does not constitute a part of the filtration circuit. The membrane filters 1a and 1b preferably comprise respective sets of vertical capillary tubes (not shown) through which the liquid being filtered flows, with any liquid which has passed through the pores in the walls of the capillary tubes being collected as filtrate and fed via filtrate ducts 3 to a filtrate receiver 4. For details of the structural and operational characteristics of such membrane filters, reference may be had, for example, to Ebner U.S. Pat. No. 4,227,999 and the publications referred to and/or cited therein (see especially column 1, line 54 to column 2, line 24), and to an article entitled "Crossflow-Mikrofiltration: Ein Membranverfahren zur Aufkonzentrierung von Suspensionen" by W. Klein, *Verfahrenstechnik* 15 (1981), No. 7, pages 490–492, the disclosures which are incorporated in this application by this reference. The filtrate accumulated in the filtrate receiver 4 can be extracted therefrom with the aid of a filtrate pump 5. The filtrate receiver can, of course, also be emptied through an appropriate drain valve 6.

The liquid to be filtered is forwarded through the filtration circuit 1 by means of a circulating pump 7, and a feed line 8 from the concentrate tank 2 is connected to the suction side of the circulating pump 7 in order to enable the diminution of liquid in the filtration circuit resulting from the extraction of filtrate therefrom to be continuously compensated for. The outlet end of the membrane filter 1a is connected by means of a duct 9 to the inlet end of the membrane filter 1b, and the outlet end of the latter communicates via a return line 10 with the suction side of the circulating pump 7. A return or reflux line 11 branches off and leads from the connecting duct 9 to the concentrate tank 2 via a throttle 12, preferably an apertured diaphragm or partition type throttle. The quantity of liquid returned to the concentrate tank 2 through the branch connection 11 between the filtration circuit and the tank can thus be adjusted by means of the throttle 12.

During the operation of the system, the liquid to be filtered is forced by the circulating pump 7 through the filtration circuit 1. The quantity of filtrate extracted from the filtration circuit is, in this regard, replaced by liquid from the concentrate tank 2 via the feed line 8, through which there is fed to the circulating pump 7 a quantity of liquid corresponding to that quantity of liquid which is branched off from the filtration circuit 1 through the return line 11. By virtue of this manner of replacement of the filtrate extracted from the filtration circuit 1, the level of the liquid in the concentrate tank 2 sinks from an upper level, designated by the solid line 13, to a lower level, designated by the dot-dash line 14. Thus, the result is that, since the quantity of solids in the concentrate tank and filtration circuit combination remains constant while the quantity of liquid decreases, the solids concentration increases slowly in the concentrate tank and rather more rapidly in the filtration circuit. In order to ensure, therefore, that this increasing solids concentration cannot lead to a rapid clogging or covering of the pores in the walls of the capillary tubes of the membrane filters 1a and 1b by means of solid particles, in accordance with the present invention there is fed directly, into the filtration circuit 1 from a reservoir 15 a quantity of the fresh liquid which is to be filtered and in which the original starting solids concentration still exists, so that the concentration conditions in the filtration circuit 1 at first tend to equalize themselves to, i.e. to decrease toward, the starting concentration conditions in the fresh liquid. Subsequently, the solids concentration in the filtration circuit 1 gradually reaches the solids concentration in the concentrate tank 2 and, by virtue of the continuous material exchange between the concentrate tank and the filtration circuit, only minimally exceeds the concentration in the tank. The change in the solids concentration in the filtration circuit 1 thereby inhibits substantially the build-up of undesired layers of solids on the filter pores.

In order to enable the fresh unfiltered liquid to be fed to the filtration circuit in a simple manner, there is provided an injection line 16 which is connected between the fresh liquid reservoir 15 and the filtration circuit 1 and bypasses the concentrate tank. Incorporated in the feed line 16 is a control valve 17 as well as an injection or feed pump 18 and a prefilter 19. The control of the valve 17 and the injection pump 18 is effected by means of a control device 20 which in the illustrated embodiment of the invention is connected to two liquid level probes 21 positioned in the concentrate tank 2 for sensing, respectively, the upper liquid level 13 and the lower liquid level 14 in the tank. When the level of the liquid in the concentrate tank 2 drops to the level 14 by virtue of the continuous extraction of filtrate, the control device 20 is activated to open the valve 17 and to start the pump 18, so that fresh liquid in which the starting solids concentration still exists is fed from the reservoir 15 directly to the filtration circuit 1 via the injection line 16. During the injection of the fresh liquid from the reservoir 15 into the filtration circuit 1, the feed of liquid from the concentrate tank 2 to the filtration circuit through the feed line 8 is interrupted by the high liquid pressure in the injection line 16. The concentrate tank 2 is at that time refilled by the quantity of liquid being returned thereinto from the filtration circuit 1 via the branch return line 11, and by virtue of the mentioned higher liquid pressure also through the line 8 which continues until the liquid in the tank reaches the upper level 13 as sensed by the appropriate one of the probes 21. This causes the control device 20 to deactivate the injection pump 18 and close the valve 17. Thereafter, the continuing filtration operation leads anew to a sinking of the level of the liquid in the concentrate tank 2, and the described addition of fresh unfiltered liquid at the starting solids concentration from the reservoir 15 to the filtration circuit 1 is then repeated over and over at the ends of successive time intervals the lengths of which are determined by the time required for the filtration of that quantity of liquid which corresponds to the difference between the liquid levels 13 and 14 in the concentrate tank 2. The duration of such a filtration interval changes, of course, with the solids concentration, so that the time intervals between the individual injections of liquid into the filtration circuit from the reservoir 15 become longer with the duration of the filtration operation.

As previously mentioned, the temperature of the liquid being filtered in the filtration circuit 1 also rises with the duration of the filtration operation. In the process of the present invention this is compensated for by the fact that the filtration circuit 1 is periodically cooled by means of the injection of the cooler fresh liquid from the reservoir 15, which additionally supports the described effect of the changes of the solids concentration in the filtration circuit.

The temperature of the liquid in the concentrate tank 2 can also be monitored with the aid of a temperature sensor 22 which is adapted via a suitable temperature control 23 to activate a valve 24 incorporated in the intake line of a cooling device 25 located in the concentrate tank 2, thereby to permit a cooling fluid to flow through the coils of the device 25 so as to ensure that the temperature of the liquid in the concentrate tank 2 will remain below a prescribed upper limit temperature.

The filtration operation as so far described is terminated when the solids concentration in the concentrate tank 2 reaches a predetermined maximum value. In that case, the injection of fresh unfiltered liquid into the filtration circuit 1 from the reservoir 15 is first manually interrupted, and the remaining contents of the concentrate tank 2 are then filtered through the filtration circuit until the quantity of the liquid in the tank reaches the level designated by the dot-dash line 26. Any remaining quantity of liquid in the tank is then removed via a drain valve 27. The attainment of the liquid level 26 can be sensed by a suitable liquid level probe 28.

After termination of a filtration cycle, the concentrate tank 2, the reservoir 15 and the pre-filter 19 can be shut off by means of suitable valves 29, 29a and 29b. Any remaining liquid in the tank 2 and the membrane filters 1a and 1b can be drained therefrom through the respective valves 27 and 30. Each filtration cycle is followed by a cleaning of the entire system, and in particular of the membrane filters. For this purpose the valves 27 and 30 are closed and the concentrate tank 2 is filled with a cleaning solution of any well known type through a separate line controlled by a valve 31. The valve 29 is then opened, and the circulating pump 7 is run for about an hour. Thereafter, the cleaning solution is drained via the valves 27 and 30 and the system is rinsed with clear water. A new filtration cycle is then started, with the valves 27 and 30 again closed and the valves 29a and 29b, opened, by refilling the concentrate tank with fresh liquid to be filtered taken from the reservoir 15 by the pump 18 and fed into the tank via the prefilter 19 and the lines 16 and 8.

The invention will be more fully explained by the following example.

An experimental installation corresponding to the system shown in the drawing included two membrane filters 1a and 1b each comprising 970 capillary tubes of polypropylene. The tubes had diameters of 1.75 mm and lengths of 0.5 m, and they provided an effective filter surface of 2.67 square meters. The quantity of liquid in the concentrate tank 2 was 120 liters, and the volume of the filtration circuit 1 was 10 liters. The feed rate of the circulating pump 7 was 23 cubic meters per hour. The throttle 12 permitted a rate of flow of about 85 liters per hour therethrough.

This installation was then used to filter an alcohol vinegar produced in a shavings generator. After a series of fourteen injections of fresh liquid characterized by a starting solids concentration of 4.8 grams per liter and a viscosity of $1.0 \times 10^{-6}$ square meters per second into the filtration circuit as herein described, the solids concentration of the vinegar contained in the concentrate tank 2 was determined to be 6 times the starting concentration or 29.0 g/l and the viscosity $2.38 \times 10^{-6}$ m²/s.

In the following table a number of values are set forth which represent the different processes in the concentrate tank and the filtration circuit in the time interval between two successive injections of fresh liquid into the filtration circuit, the first of which was the last of the fourteen injections mentioned above. At the time point "x" the said last injection of fresh liquid into the filtration circuit 1 was terminated. The time point x+14 minutes represents the time just before the next injection of fresh liquid. The various values of kinematic viscosity $V_k$ and the solids concentration $C_k$ in the concentrate tank, the kinematic viscosity $V_f$ and the solids concentration $C_f$ in the filtration circuit, and the temperature t in the filtration circuit as well as the specific filtration efficiency $L_s$ were measured at the indicated intervals of several minutes each within this 14-minute period.

TABLE

| Time (a) | $V_k$ (b) | $V_f$ (b) | $C_k$ (c) | $C_f$ (c) | t (d) | $L_s$ (e) |
|---|---|---|---|---|---|---|
| x | 2.38 | 1.70 | 29.0 | 15.0 | 18.0 | 45.0 |
| x + 3 | 2.44 | 1.90 | 30.0 | 20.0 | 18.3 | 41.7 |
| x + 6 | 2.52 | 2.21 | 30.5 | 23.5 | 18.5 | 39.5 |
| x + 9 | 2.60 | 2.36 | 31.5 | 27.5 | 19.0 | 36.8 |
| x + 14 | 2.70 | 2.76 | 33.0 | 33.5 | 20.1 | 31.7 |

(a) In minutes
(b) In $10^{-6}$ m²/s
(c) In g/l
(d) In °C.
(e) In l/m²/h

As can be seen from the above table, in the interval between the mentioned two successive injections of fresh unfiltered vinegar the specific filtration efficiency $L_s$, expressed in liters per square meter per hour, decreases from 45.0 to 31.7, and during this interval averages 40.0 l/m²/h. Subsequently thereto, at a solids concentration corresponding to 25 times the starting solids concentration in the fresh vinegar, the filtration efficiency was determined to be 31.5 l/m²/h in average, while at a solids concentration corresponding to 50 times the starting solids concentration the filtration efficiency was determined to be 27.5 l/m²/h in average.

It is further to be noted that if the unfiltered fresh vinegar is not fed directly into the filtration circuit in accordance with the present invention but rather is fed first into the concentrate tank, the solids concentration in the latter as well as in the filtration circuit increases continuously. As a consequence, it is then found that at a solids concentration in the concentrate tank of only 6 times the starting solids concentration, a specific filtration efficiency of 33.5 l/m²/h is achieved. As the solids concentration in the tank then rises to 10 times the starting solids concentration, the filtration efficiency decreases to about 22.0 l/m²/h, and at a solids concentration of 15 times the starting value the filtration efficiency is only 12.5 l/m²/h. The viscosity values at the various points correspond to the respective solids concentrations.

With the aimed for end concentration of the solids being around 60 times the starting solids concentration, it can be seen that a filtration of the vinegar in question in accordance with the techniques of known processes cannot reach such an end point but must be shut down already at a solids concentration of about 20 times the starting concentration because of the rapidly diminishing filtration efficiency. The filter must then be cleaned and a new cycle started. The unavoidable consequence is that only a small filtrations rate per day is achieved with many interruptions and much work.

In contrast thereto, in a filtration process according to the present invention a solids concentration of 60 times the starting concentration can easily be attained with a final filtration efficiency of more than 25 l/m²/h in average, which means a continuously high filtration rate per day, long cycles of a few weeks, few interruptions, and very little work.

It will be understood that the foregoing description of preferred embodiments of the process and apparatus according to the present invention is for purposes of illustration only and that the herein disclosed process and apparatus are susceptible to a number of changes and modifications none of which entails any departure from the spirit and scope of the present invention as defined by the hereto appended claims.

What is claimed is:

1. In the process of ultrafiltration of a liquid having a starting solids concentration in a reservoir, wherein the liquid to be filtered is circulatingly pumped through at least one filtration circuit including at least one membrane filter, liquid that has passed through the membrane filter is continuously extracted from the filtration circuit as filtrate, a part of the unfiltered liquid being circulated through the filtration circuit is diverted therefrom through a return line into a separate concentrate tank, and unfiltered liquid in the concentrate tank is fed therefrom through a feed line into the filtration circuit to compensate for the continuous loss of liquid therefrom as a consequence of the extraction of filtrate which in turn causes a continuous increase in the solids concentration in the filtration circuit; the improvement comprising the steps of repeatedly at spaced time intervals bringing the solids concentration in the filtration circuit closer to the starting solids concentration by feeding from said reservoir directly into the filtration circuit at said spaced time intervals respective quantities of fresh unfiltered liquid having the starting solids concentration.

2. In the process of claim 1, the improvement comprising that the fresh unfiltered liquid having the starting solids concentration is fed from the reservoir into the filtration circuit each time after a predetermined quantity of filtrate has been extracted from the filtration circuit.

3. In the process of claim 2, the improvement comprising that a decrease of the quantity of liquid in the concentrate tank resulting from the loss of liquid is sensed to determine when said predetermined quantity of filtrate has been extracted from the filtration circuit.

4. In the process of claim 3, the improvement comprising that a change in the level of the liquid in the concentrate tank from a predetermined higher value to a predetermined lower value is sensed to initiate the feed of fresh unfiltered liquid having the starting solids concentration into the filtration.

5. In the process of claim 4, the improvement comprising that a change in the level of the liquid in the concentrate tank from said predetermined lower value to said predetermined higher value is sensed to interrupt the feed of said fresh unfiltered liquid into the filtration circuit.

6. In the process of claim 1, 2 or 3, the improvement comprising that the intermittent feed of said fresh unfiltered liquid having the starting solids concentration into the filtration circuit is repeated until the liquid in the concentrate tank reaches a predetermined maximum solids concentration.

7. In the process of claim 6, the improvement comprising that said fresh unfiltered liquid having the starting solids concentration is fed into the filtration circuit at a temperature which is lower than the temperature of the circulating unfiltered liquid in the filtration circuit.

8. In the process of claim 1, 2 or 3, the improvement comprising that said fresh unfiltered liquid having the starting solids concentration is fed into the filtration circuit at a temperature which is lower than the temperature of the circulating unfiltered liquid in the filtration circuit.

9. In the process of claim 8, the improvement comprising that the unfiltered liquid in the concentrate tank is cooled when the temperature of that liquid exceeds a predetermined upper limit value.

10. In the process of claim 1, 2 or 3, the improvement comprising that the unfiltered liquid in the concentrate tank is cooled when the temperature of that liquid exceeds a predetermined upper limit value.

11. In the process of claim 6, the improvement comprising that the unfiltered liquid in the concentrate tank is cooled when the temperature of that liquid exceeds a predetermined upper limit value.

12. In the process of claim 7, the improvement comprising that the unfiltered liquid in the concentrate tank is cooled when the temperature of that liquid exceeds a predetermined upper limit value.

13. In an apparatus for performing an ultrafiltration of a liquid having a starting solids concentration, which apparatus includes at least one filtration circuit with at least one membrane filter therein, a circulating pump for feeding unfiltered liquid into said filtration circuit, a concentrate tank separate from said filtration circuit, a feed line running from said concentrate tank to said filtration circuit, a return line running from said filtration circuit to said concentrate tank, and a reservoir for containing fresh unfiltered liquid having the starting solids concentration; the improvement comprising that:
 (a) an injection line bypassing said concentrate tank interconnects said reservoir directly with said filtration circuit; and
 (b) control means are provided for selectively opening and closing said injection line to enable said fresh unfiltered liquid to be fed repeatedly into said filtration circuit at spaced time intervals for repeatedly at said spaced time intervals bringing the solids concentration in said filtration circuit closer to the starting solids concentration.

14. In an apparatus according to claim 13, the improvement comprising that said control means include
 (a) an injection pump connected in said injection line,
 (b) a liquid level sensing device disposed in said concentrate tank and responsive to the attainment of two different predetermined levels by the liquid in said concentrate tank, and
 (c) means operatively connecting said liquid level sensing device with said injection pump to activate and deactivate the latter in dependence, respectively, on whether the lower or the higher liquid level is sensed by said liquid level sensing device.

15. In an apparatus according to claim 13 or 14, the improvement comprising that a cooling device is disposed in said concentrate tank, a temperature sensor is positioned in said concentrate tank for sensing the temperature of the liquid therein, and means operatively connect said temperature sensor with said cooling device to activate or deactivate the same in dependence, respectively, on whether the temperature of the liquid in said concentrate tank is above or below a predetermined limit value.

* * * * *

UNITED STATES PATENT AND TRADEMARK OFFICE
CERTIFICATE OF CORRECTION

PATENT NO. : 4,689,153

DATED : August 25, 1987

INVENTOR(S) : HEINRICH FOLLMANN ET AL.

It is certified that error appears in the above-identified patent and that said Letters Patent is hereby corrected as shown below:

In column 8, line 64, for "filtration" read --filtration circuit--.

Signed and Sealed this

Fifteenth Day of December, 1987

Attest:

DONALD J. QUIGG

*Attesting Officer*   *Commissioner of Patents and Trademarks*